United States Patent [19]

Wesley

[11] 4,266,427
[45] May 12, 1981

[54] COMBUSTION TIMING METHOD AND APPARATUS WITH DIRECT TDC DETECTION

[75] Inventor: William M. Wesley, Kildeer, Ill.

[73] Assignee: Creative Tool Company, Lyons, Ill.

[21] Appl. No.: 148,543

[22] Filed: May 9, 1980

Related U.S. Application Data

[63] Continuation-in-part of Ser. No. 56,501, Jul. 11, 1979.

[51] Int. Cl.³ .......................................... G01M 15/00
[52] U.S. Cl. ................................................. 73/119 A
[58] Field of Search ............... 73/119 A, 115, 35, 116, 73/49.7, 37

[56] References Cited

U.S. PATENT DOCUMENTS

| 3,183,708 | 5/1965 | Roddick | 73/35 |
| 3,389,599 | 6/1968 | Beale | 73/115 |
| 3,943,759 | 3/1976 | Kato et al. | 73/115 |

FOREIGN PATENT DOCUMENTS

| 386298 | 9/1973 | U.S.S.R. | 73/115 |

Primary Examiner—Jerry W. Myracle
Attorney, Agent, or Firm—Neuman, Williams, Anderson & Olson

[57] ABSTRACT

Method and apparatus for timing combustion events in the combustion chamber of an internal combustion engine wherein a piezoelectric transducer is utilized to develop a signal corresponding to the first derivative of pressure within the cylinder being monitored. A signal processing circuit detects that change in polarity of the first derivative signal which occurs at the transition between compression and expansion of cylinder volume during the combustion cycle of the piston. Circuitry is provided for effectively disregarding all other polarity changes or "zero crossings" of the transducer output signal which are not related to the achievement of the top dead center position by the piston within the cylinder. This directly derived indication of a transition from compression to expansion in the combustion chamber is combined with other timing signals for the monitoring or controlling of injection or ignition timing for the engine.

14 Claims, 3 Drawing Figures

COMBUSTION TIMING METHOD AND APPARATUS WITH DIRECT TDC DETECTION

RELATED CASE

This application is a continuation-in-part of my U.S. application Ser. No. 056,501, filed July 11, 1979, now pending, the disclosure of which is incorporated herein by reference.

This invention relates generally to methods and apparatus for timing internal combustion engines, and more particularly to timing devices using multiple engine transducers.

In the past, the piston top dead center condition for timing purposes has normally been taken from markings on the engine flywheel or dynamic damper as correlated with markings on the bell housing. The markings have either been monitored with a timing light or strobe, or on other systems with a magnetic or mechanical pick-up mounted to the engine. In certain vehicles the timing marks are on the fan pulley at the front of the engine rather than on the flywheel. In either event, the prior systems suffer from mechanicial errors that can arise between the flywheel position and the actual position of the piston within the cylinder. Worn engines, in particular, have a substantial amount of timing variance due to wear in the bearings on the piston, the crank shaft and timing gears. Of course, improper flywheel or pulley alignment during manufacture can also result in misalignment between piston position and crankshaft markings.

One additional system is known to use a function generator driven by the engine crank shaft for providing a top dead center indication at repetitive points during the engine's operating cycle. This too, however, suffers from mechanical delays and slippage in the drive train.

The method and apparatus of the present invention is intended to overcome the drawbacks and deficiencies of the prior system and provide for the timing of combustion events in one or more cylinders of an internal combustion engine by monitoring those events from within the cylinder itself. As such, the system is unaffected by mechanical slippage, misalignment or wear between the pistons and other portions of the engine. This method and apparatus is applicable to both carbureted engines and diesel engines. For caburetted engines the system may be used to measure ignition timing if utilized in conjunction with a spark detector, whereas in diesel engines the system may be used to measure fuel injection timing utilizing various fuel system transducers.

While piezoelectric tranducers are not broadly new to engine analysis application, their application has been limited in most instances to accelerometers, vibration detectors, and in a few instances, to attempts at obtaining absolute measurements. In most of the configurations known to exist, the transducers have been utilized in conjuction with an isolation device such as charge amplifier to prevent electrical loading of the transducer during its normal operation. Pressure transducers, in particular, have required such isolation in developing their pressure-related signals. A discussion of a cylinder pressure transducer utilizing piezoelectric materials is contained in paper number 790139 of the SAE by Randall and Powell.

As noted in the applicant's aforementioned U.S. application Ser. No. 056,501, certain transducers utilizing the piezoelectric principal provide an output signal which varies substantially in accordance with the time rate-of-change, or first derivative, of cylinder pressure when subjected to a resistive electrical load. Among the transducers which exhibit this phenomenon are the injection nozzle transducers disclosed in FIGS. 1, 2, 6, 6A, 6B and 7 of U.S. Pat. No. 4,036,050, the glow plug or spark plug replacement transducers disclosed in pending U.S application Ser. No. 960,600, filed Nov. 14, 1978 and the glow plug, split and solid washer transducers disclosed in pending U.S. application Ser. No. 007,347, filed Jan. 29, 1979. Each of these transducers includes a piezoelectric element or slabe which is mounted to a transducer housing by conductive adhesive in a plane transverse to the force to be detected. Additionally, they are mounted within their housing such that they are flexed or compressed by pressure variations from within the engine cylinder, the net result being that, when subjected to electrical loading of a resistive nature, they produce the aforesaid signal representative of the first derivative of pressure.

My prior application Ser. No. 056,501 discloses the utilization of this phenomenon and transducers of this type in a compression rate analyzer which may be used for comparative analyses of the engine cylinders and injection system on a cylinder-by-cylinder basis. Of primary interest in that application are the amplitude characteristics of the transducer output signals. The system of the present invention utilizes the discovery that the aforesaid first derivative signal is substantially unaffected by combustion events which occur during the compressing stroke of the piston within they cylinder, with the result being that the pressure first derivative signal changes polarity at the top dead center position (TDC) of the piston to signal the transition from the compression stroke (upward piston movement) to the power stroke (downward piston movement) during the combustion cycle of the engine. Furthermore, the resistively loaded or "lossy" transducer circuits disclosed herein continue to act as a true indicator of the first derivative of pressure over wide variations in engine speed so that accurate detection of the top dead center position by the piston can be continuously monitored and utilized over the full range of engine speeds. The signal does not exhibit the phase shift and other signal distortions over varying frequencies that normally result from electrical differentiators and filters. A signal processing circuit is provided which responds to the presence first derivative signal to selectively monitor the signal to detect only those changes in polarity which occur between the compression and expansion of voluem in the combustion chamber. Having derived the signal representing the top dead center position of the cylinder directly from the combustion chamber itself, additional circuitry is provided for utilizing this signal for the timing of various combustion events, such as the injection of fuel by the injection pump of the diesel engine. As such, timing can be achieved accurately, directly and without the need for complicated techniques such as those presently required in utilizing timing lights and strobes.

Other objects and advantages of the invention will become apparent upon reading the following detailed description and appended claims and upon reference to the accompanying drawings.

IN THE DRAWINGS

Figure 1:
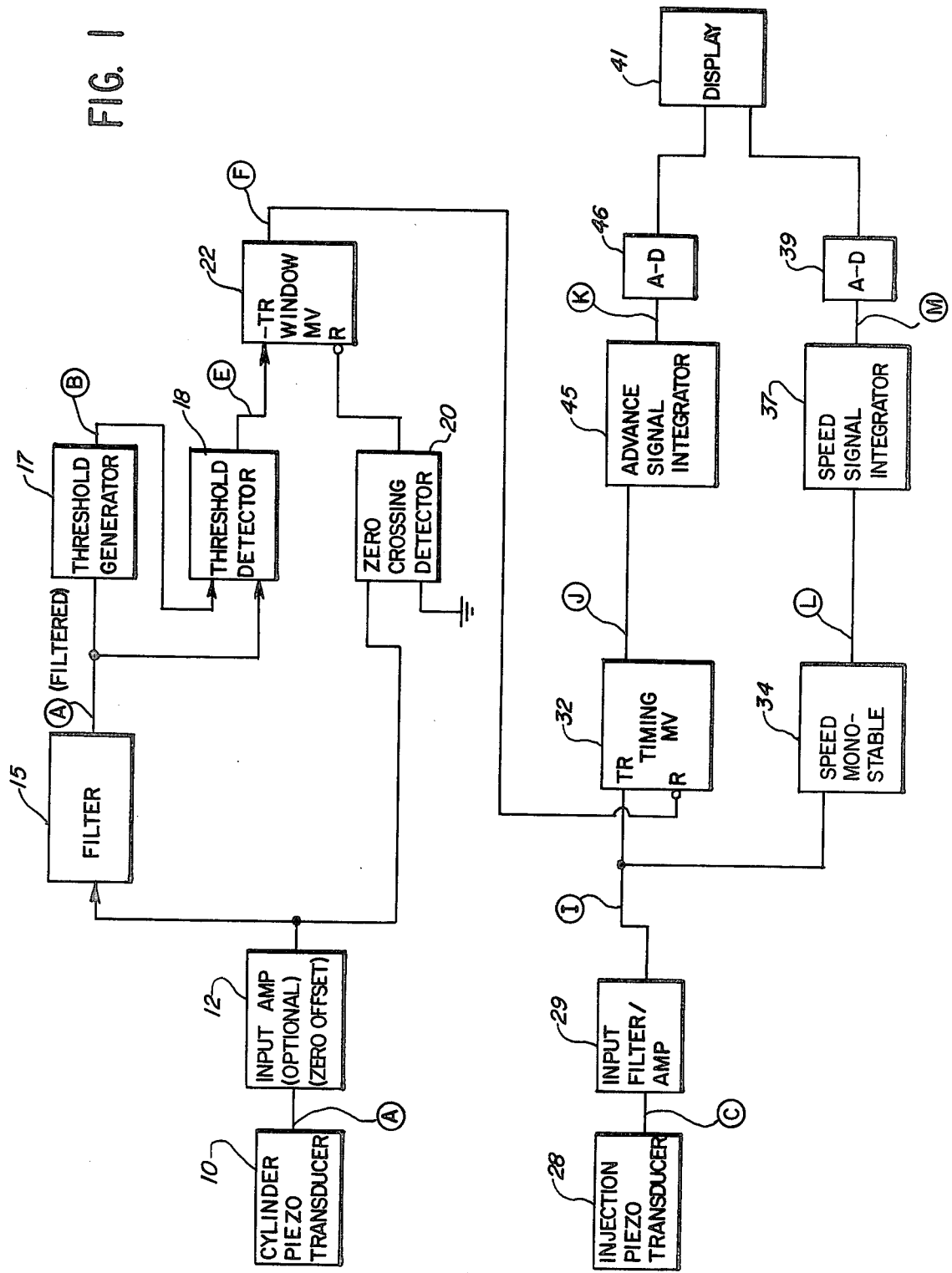
FIG. 1 is a general block diagram of a fuel injection timing system utilizing the method and apparatus of the present invention.
Figure 2:
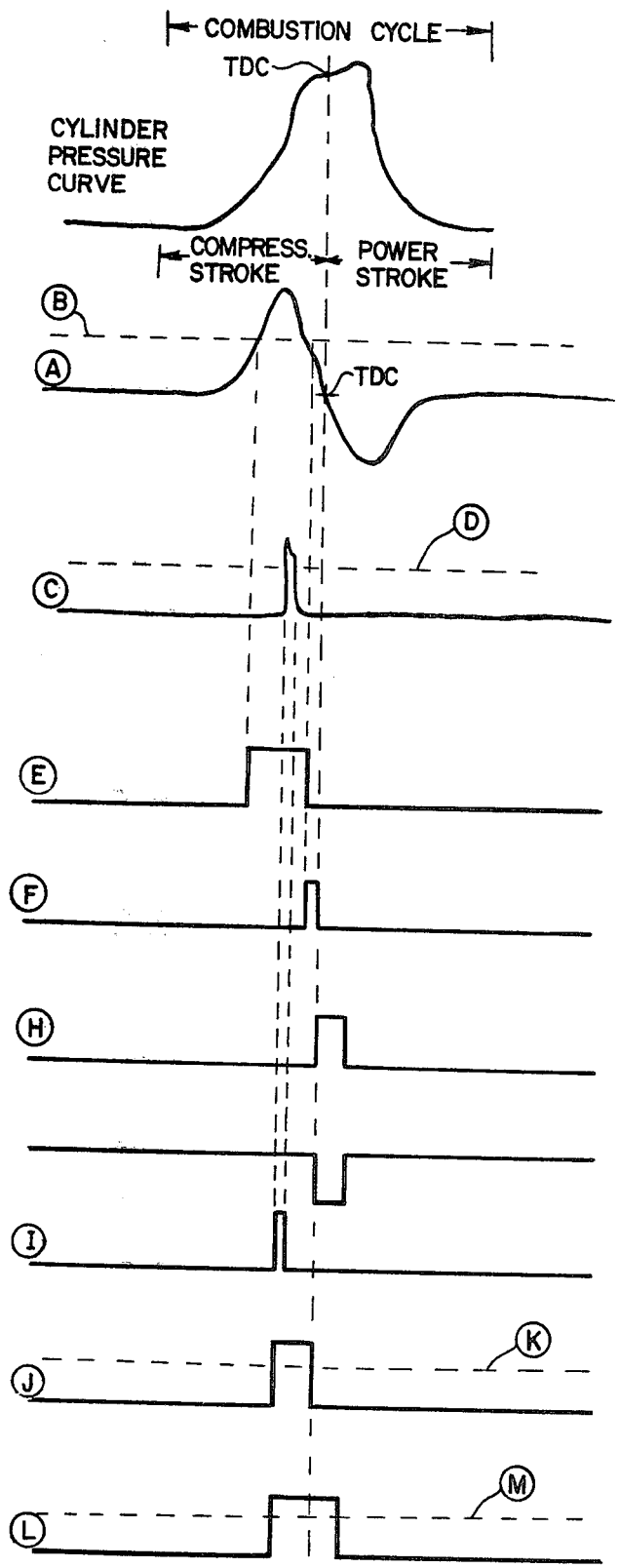
FIG. 2 represents a timing diagram illustrating the operation of the system disclosed in FIG. 1.

Returning first to FIG. 1, the system employs two basic sensors to be applied to the engine. A cylinder transducer 10 is used to obtain a signal corresponding to the first derivative of pressure occurring within the cylinder itself. Cylinder transducers which are found suitable for this purpose include the transducers disclosed in FIGS. 1, 2, 6, 6A, 6B and 7 of U.S. Pat. No. 4,036,050 for detecting pressure changes transmitted along the axis of an injector nozzle, the glow plug or sparkplug replacement transducers disclosed in pending U.S. application Ser. No. 960,600 filed Nov. 14, 1978 and the glow split or solid washer transducers disclosed in pending U.S. application Ser. No. 007,347 filed Jan. 29, 1979. The disclosures of these transducers from the foregoing patents and applications are incorporated herein by reference. Each of these transducers produces an output signal when subjected to a resistive load that varies in amplitude substantially in accordance with the first derivative of pressure within the combustion chamber of the cylinder to which it is attached. The output of the cylinder transducer 10 is applied to an input amplifier 12 which may be a separate element or incorporated within a filter 14 as described below. The input amplifier 12, when used, should provide a zero DC offset while providing a substantially constant resistive load to the cylinder transducer 10 to maintain its pressure first derivative output characteristic.

For the purpose of detecting the ocurrence of the top dead center condition (TDC) from the first derivative pressure signal created by the transducer 10, means are provided for detecting the change in polarity of the transducer output signal which occurs between constriction and expansion of the combustion chamber volume during the power cycle of the engine. This is effectively accomplished by a circuit consisting of a filter 15, a threshold generator 17 and a threshold detector 18 which effectively generates a time period or "window" for monitoring the zero crossing condition of the transducer output signal during the power cycle. The filter 15 receives its input either directly from the transducer or through the optional amplifier 12 and effectively removes the spurious signal components and noise resulting from engine vibration and the like which might provide false triggering for subsequent operating circuits. The operation of the threshold detector 18 is best understood by reference to the timing diagrams of FIG. 2. Signal A is the transducer output signal. The threshold generator 17 produces a signal B corresponding to a predetermined percentage of the peak amplitude of the transducer signal A. As shown, the percentage chosen is approximately fifty to sixty percent. The signal B provides the threshold for a threshold detector circuit 18, the other input of which receives the transducer signal A. The output of the threshold detector 18 is shown as signal E and corresponds in width to the portion of the transducer output signal which exceeds the threshold level signal B. Noise and spurious spikes on the transducer signal which fail to reach the amplitude of the threshold signal B are thus ignored by the threshold detector 18.

It will be seen, therefore, that the output level from the threshold generator 16, as indicated at B is chosen so that it exceeds the ambient noise level of the transducer output signal while still allowing the primary pulse resulting from the compression stroke of the piston to be detected by the threshold detector 18. The signal generated as a result of detection of this primary pulse effectively initiates the monitoring window during which the output from the cylinder transducer 10 is monitored for a change in polarity indicating a transition from the compression stroke to the power stroke by the piston. This change in polarity is detected by the zero-crossing detector 20, preferably in the form of an operational amplifier having one of its inputs referenced to ground potential or whatever other potential to which the cylinder transducer 10 is also referenced. The monitoring window itself is created by provision of a window multivibrator circuit 22 having its negative trigger input (−TR) activated by the trailing edge of the output pulse E from the threshold detector 18. As thus connected, the output signal F from the window multivibrator 22 goes to a high logic level only when the piston power stroke nears completion. At the end of the power stroke the zero-crossing detector 20 signals a transition in polarity of the output of the cylinder transducer 10 by producing a negative-going signal at the reset input R of the window multivibrator 22. This returns the output signal F of the multivibrator 22 to its low state, signalling the detection of the achievement of top dead center by the piston.

For the purpose of utilizing this top dead center signal for timing purposes, means are provided for measuring the relationship between fuel delivery to the cylinder of a diesel engine and the detection of the top dead center condition of the piston. To this end, the apparatus depicted in FIG. 1 further includes a piezoelectric transducer 28, which is coupled to the fuel line for the monitored cylinder, preferably at the nozzle or at the injection pump. The injection transducer 28 may be any of a plurality of known transducers, including the split-nut transducer depicted in FIGS. 8, 8a and 8b of U.S. Pat. No. 4,109,518, issued Aug. 29, 1978 to Creative Tool Company, the disclosure of which is incorporated herein by reference. The output from the injection transducer 18 is shown as curve C in FIG. 2 and includes a primary spike occurring at the instance of injection, which is typically several degrees in advance of the achievement of the top dead center position by the piston. This signal is fed through a conditioning circuit 29 which may include filtering and amplifier stages to eliminate spurious noise and unwanted signals while passing the primary pulse resulting from fuel injection as a sharply-defined pulse as shown on curve I of FIG. 2. This pulse is fed to the trigger input (TR) of a multivibrator circuit 32 to initiate a timing pulse, shown as curve J in FIG. 2. Simultaneously, the signal I at the output of the filter amplifier 29 is preferably applied to a monostable multivibrator 34 which produces a constant width output pulse (L in FIG. 2). The pulse on signal L at the output of the monostable 34 increases in frequency, and hence duty cycle, with increasing speed of the engine. This signal is integrated in a speed signal integrator circuit 37 to produce a variable dc level M, indicative of engine RPM. This signal, in turn, is fed to an analog-to-digital converting circuit 39, the output of which drives the display 40 providing a tachometer function for the operator.

For the purpose of providing an output indication of injection timing relative to the top dead center position of the piston, the timing multivibrator 32 has its reset input R activated by the trailing edge of the signal F from the window multivibrator 22, which signals the top dead center condition. Therefore, the pulse width of the signal J at the output of the multivibrator 32 corresponds to timing advance in real time relative to the top dead center condition. Of course, this signal also varies in frequency with the speed of the engine. The ouput of the timing multivibrator 32 is fed to an integrating circuit 44 to produce a varying dc level indicated as K and shown on FIG. 2. This signal, in turn, is fed to an analog-to-digital conversion circuit 46 which drives the display 41 to advise the operator of the injection timing. The display 41 may be any of a variety of different devices suitable for decimal read-out and may include scaling circuits for both the timing and tachometer functions as necessary. Additionally, the display 41 may either simultaneously display both timing and RPM or it may include a control for selecting between the display of timing or the display of RPM. It will be appreciated that the configuration described causes the output of the timing multivibrator 32 to vary in pulse width with advances in timing and with speed of the engine. As the speed is doubled without a change in timing, for example, the width of the pulses of the signal J will be cut in half, while their frequency of occurrence doubles, the net result being no net change in the effective duty cycle of the multivibrator 32, per unit of time. Of course, most engines typically have various types of automatic advance devices operated by vacuum or centrifugal force arising during changes in speed. The apparatus of the present invention allows convenient and accurate monitoring of these timing changes.

Figure 3:
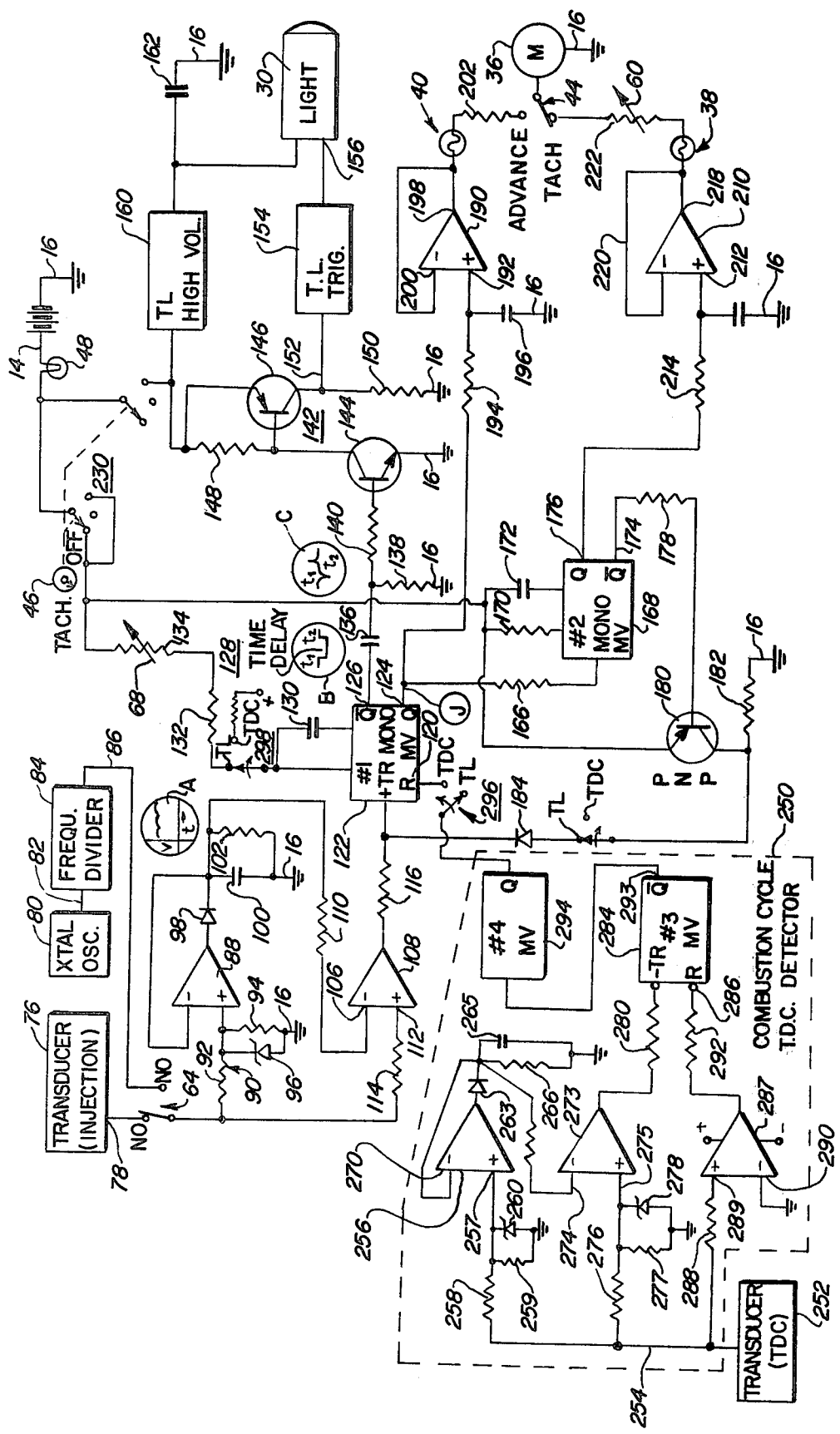
FIG. 3 is a more detailed circuit schematic of one embodiment of the present invention.

A more detailed embodiment of the present invention is shown in FIG. 3, wherein the combustion cycle TDC detector shown generally in the upper part of FIG. 1 is combined with an injection timing circuit which is a modified version of that shown in U.S. Pat. No. 4,185,494, assigned to Creative Tool and issued Jan. 29, 1980. The description of the latter system contained in U.S. Pat. No. 4,185,494 is incorporated herein by reference and will not be repeated in detail here. Suffice to say that the system includes a transducer 76 for detecting injection from any of the plurality of locations on the cylinder fuel line. This signal is passed through a threshold detecting circuit consisting of operational amplifiers 88 and 108 and thereafter applied to the trigger input of a monostable multivibrator circuit 122. For deriving engine speed or RPM the output 124 of the monostable 122 is coupled to a second monostable multivibrator 168 which produces a constant width pulse which varies in frequency with the speed of the engine. This pulse train in turn is integrated in a circuit which includes an operational amplifier 210 and is applied to the meter 36 during operation in the TACH mode. For timing purposes, the circuit includes a timing light 30 which is controlled by a pair of switching transistors 144 and 146 which in turn are activated at the completion of repetitively occuring delay periods created by the monostable multivibrator 122. The duration of the delay period for the strobe light 30 is controlled by a network which includes a variable pontentiometer 134 on the operator's control panel. The delay period of the multivibrator 122 is controlled by the potentiometer 134 and is adjusted by the operator until the timing light 30 repetitively illuminates during correlation between markings on the flywheel or fan pulley and markings on the engine itself. The timing pulses at the output 124 of the multivibrator 122 are integrated to produce an output indication of advance timing in the manner discussed above in connection with FIGS. 1 and 2.

When utilized in conjuction with the present invention, the timing circuitry includes several modifications which allow control of the interval of the timing multivibrator 122 to be assumed by the combustion cycle TDC detector shown in the lower left-hand corner of FIG. 3.

The combustion cycle TDC detector 250 receives its input from a transducer 252, which may be any of the plurality of the cylinder or combustion chamber transducers described above. The output of the transducer 252 is provided on a line 254. Low-pass filtering may optionally be provided at the output of the transducer 252 to remove very high frequency components not directly related to the combustion events. However, any filtering must be done with devices which introduce no phase shift and which preferably provide a constant-resistance load at all frequencies of the transducer 252. For the purpose of generating a threshold voltage level corresponding to the average peak value of the output signal from the transducer 252, there is provided an operational amplifier 256 having its non-inverting input terminal 257 driven from the line 254 through a resistor 258. A second resistor 259 is connected to ground and is in parallel with a zener diode 260. The resistor 259 forms a voltage divider with the series resistor 258 to establish a level at the amplifier input 257 which represents a percentage of the transducer signal at any given time. A diode 263 connects the output of the amplifier 256 to an RC parallel circuit consisting of a capacitor 265 and resistor 266. This RC network is referenced to ground and effectively acts as a slow integrator to store the peak levels of the outputs from the amplifier 256. Unity gain from the amplifier 256 is effectively established by feedback from the cathode of the diode 263 back to the inverting input terminal 270 of the amplifier 256.

For utilizing the threshold voltage developed at the output of the threshold generating circuit there is provided a second operational amplifier 273 which receives the threshold voltage at its inverting input terminal 274. The non-inverting input terminal 275 of the amplifier 273 monitors the transducer signal from the line 254 through a network consisting of a series resistor 276, a shunt resistor 277 and a zener diode 278 referenced to ground. The zener diode 278 protects the input 275 of the amplifier 273 from excessive voltage swings. the amplifiers 256 and 273 combine to provide a self-adjusting threshold detector which detects only those portions of the output signal from the transducer 252 which exceed the predetermined threshold. That threshold is set by selection of the resistors 258 and 259 such that the ambient noise level on the transducer output signal is ingorned while the primary pulse created by the transducer during the compression stroke of the piston is detected. The pulse generated during the compression stroke at the output of the amplifier 273 is substantially rectangular in configuration due to the open-loop, high-gain configuration of the amplifier 273. This pulse is represented as curve E in FIG. 2 and is coupled through a resistor 280 to one of the trigger inputs (-TR) of the multivibrator circuit 284.

Connected as shown, the multivibrator circuit 284 is activated in response to the trailing edge of the threshold detector output pulse, effectively initiating a monitoring period shortly prior to the achievement of TDC by the piston. Thereafter the multivibrator circuit 284 effectively monitors for the achievement of the top dead center position by the piston by monitoring the output signal of the transducer 252 for its next polarity change. To this end, the multivibrator 284 additionally has its reset terminal controlled by a zero-crossing detector which includes an operational amplifier 287 acting as a voltage comparator. A series resistor 288 couples the output signal from the transducer 252 to the noninverting input terminal 289 in the amplifier 287, while the inverting input terminal 290 thereof is referenced to ground. While the reference for the zero-crossing detector is depicted as ground potential on the assumption that the transducer 252 also produces its signal with reference to ground, it will be appreciated that other configurations may be utilized within the scope of the invention for detecting changes in polarity of the tranducer output signal. A series resistor 292 couples the output of the amplifier 287 to the reset terminal 286. The circle at the input of the reset terminal 286, like a similar circle at the trigger input (−TR) of the multivibrator 284, signifies that the device responds to a trailing edge of the signal at that terminal. As such, it will be seen that the output terminal 293 of the multivibrator 284 goes to a first logic level on the trailing edge of the threshold detector output pulse from the amplifier 283 and returns to its original logic level upon the detection of the next change of polarity in the output signal from the transducer 252. From the foregoing discussions, it will be appreciated that the latter event signals the achievement of the top dead center position by the piston within the cylinder being monitored. The multivibrator circuit 284 will not be activated again until the trailing edge of the next output pulse from the threshold detector amp 273, which occurs shortly before TDC in the next compression stroke.

For generating a fixed width pulse of short duration upon the detection of top dead center condition, there is provided a further multivibrator circuit 294 triggered from the output 293 of the multivibrator circuit 284. The output of the multivibrator circuit 294 is, in turn, selectively coupled to the reset terminal R of the monostable multibibrator 122 to conclude the advance timing interval as shown in curve J of FIG. 2. A pair of single-pole, double-throw switches 296 and 298 provide the operator with a choice of timing from a conventional timing light (TL) or from the combustion cycle TDC detector 250.

While the multivibrator circuit 294 is preferably a monostable multivibrator, the multivibrator 284 may be either a long duration monostable multivibrator capable of being reset at any point during its active interval upon activation of its reset input R, or it may be a simple flip-flop circuit. Similarly, the timing multivibrator 122 may vary in form depending on use. Where the timing light 30 is used, a manual control of delay period is necessary, and a monostable multivibrator may be used; however, where the additional feature of a timing light is unnecessary, the multivibrator circuit 122 may be a simple flip-flop or bistable multivibrator having one input triggered from the injection transducer 76 and a second input triggered from the combustion cycle TDC detector 250 so that the output signal J varies in pulse width in accordance with injection timing relative to the top dead center position of the piston.

The terms transducer circuit and transducer circuit means as used herein in connection with the combustion chamber transducers, refer to both the piezoelectric transducer and those electrical load elements, which cause the output of the transducer to vary in accordance with the first derivative of the pressure being monitored from within the cylinder.

It will further be appreciated that the combustion cycle TDC detector 250 may be utilized with any of a variety of other injection or combustion timing systems. Fpor carbureted engines, for example, the injection transducer 76 in the circuit of FIG. 3 is replaced by the transducer for detecting energization of the spark plug in the cylinder being monitored. The output indication provided by the meter 36 in this instance represents either engine speed or spark advance relative to top dead center, as determined by the position of the selector switch 44. Furthermore, the output of the timing circuit shown in FIG. 3 may be utilized for functions in addition to visual monitoring on the meter 36. It will be recalled that the pulse width of the multivibrator 120 of FIG. 3 (like the multivibrator 32 of FIG. 1) corresponds to the actual time of injection or ignition advance, whereas the output from the advance signal integrator also varies with engine speeds and represents the injection or ignition advance in degrees of crank shaft rotation. Either or both of these timing signals may be utilized to control actual advance timing through various electrical and mechanical devices to provide closed loop control of combustion timing.

While particular embodiments of the invention have been shown, it will be understood, of course, that the invention is not limited thereto since modification may be made by those skilled in the art, particularly in light of the foregoing teachings. It is contemplated by the appended claims to cover any such modifications as incorporate those features which constitute the essential features of these improvements within the true spirit and the scope of the invention.

I claim as my invention:

1. A system for detecting the top dead center position of an engine piston during its combustion cycle comprising transducer circuit means coupled to the combustion chamber of at least one cylinder of said engine for producing an output signal the amplitude of which varies substantially in accordance with the first derivative of pressure within said cylinder;

a signal processing circuit responsive to said first derivative signal for producing an output signal upon a change of polarity of said first derivative signal which occurs between the compression and expansion of volume in the combustion chamber during the combustion cycle; and, means for utilizing said polarity change as an indication of the achievement of the top dead center position by said piston.

2. A system according to claim 1 for detecting the top dead center position of an engine piston during its combustion cycle wherein said signal processing circuit includes a zero crossing detector coupled to said tranducer circuit for signalling each change in polarity of said transducer circuit signal;

means for detecting the compression stroke of the piston during its combustion cycle from a change in said transducer circuit signal; and, means responsive to said zero crossing detector and said compression stroke detecting means for generating said processing circuit output signal whenever said zero crossing detector signals a polarity change after the beginning of the compression stroke.

3. A system according to claim 2 for detecting the top dead center position of an engine piston during its combustion cycle wherein said means for detecting the compression stroke of the piston is a threshold detector circuit which is responsive only to the large changes in amplitude of said transducer signal resulting from the high combustion chamber pressures created during the compression stroke.

4. A system according to claim 3 for detecting the top dead center position of an engine piston during its combustion cycle wherein said threshold detector produces a pulse which corresponds in width to that portion of said transducer circuit signal which exceeds a predetermined threshold and wherein said signal processing circuit further includes means activated by said threshold detector pulse for monitoring the output of said zero crossing detector and producing a signal in response thereto which corresponds to the achievement of the top dead center position by said piston.

5. A system according to claim 4 for detecting the top dead center position of an engine piston during its combustion cycle wherein said monitoring means is activated by the trailing edge of said threshold detector pulse so that the output of said zero crossing detector is only monitored to produce said top dead center indication for a fractional portion of the combustion cycle following said theshold detector pulse.

6. A system according to claim 1, 2, 3, 4 or 5 for detecting the top dead center position of an engine piston during its combustion cycle wherein said transducer circuit means includes a piezoelectric transducer for detecting pressure changes from within said cylinder through the engine aperture normally provided for glow plugs or spark plugs and means for deriving a signal from said piezoelectric transducer which varies substantially in accordance with the first derivative of pressure within said cylinder.

7. A system accordingly to claim 1, 2, 3, 4 or 5 for detecting the top dead center position of an engine piston during its combustion cycle wherein said transducer circuit means includes a piezoelectric transducer in the form of a washer-shaped element inserted around the threaded shank portion of a glow plug and adapted to be tightly compressed by said glow plug against the engine so as to develop a signal during pressure changes acting upon the forward end of said glow plug from within said cylinder.

8. A system accordingly to claim 1, 2, 3, 4 or 5 for detecting the achievement of the top dead center position by a piston in a cylinder of a diesel engine having a fuel injection nozzle extending into said cylinder from the outside of the engine wherein said transducer circuit means includes a piezoelectric transducer coupled to said injection nozzle and adapted to produce a signal during pressure changes acting upon the forward end of said nozzle from within said cylinder.

9. A system for detecting the achievement of the top dead center position of a piston in a cylinder of an internal combustion engine during the combustion cycle for that cylinder comprising a transducer circuit including a transducer element operatively associated with a chosen engine cylinder and means for deriving a signal therefrom which corresponds substantially to the first derivative of pressure within said cylinder;

means responsive to said first derivative signal for detecting the compression stroke of the piston from an increase of said first derivative signal during the combustion cycle of said piston; and, means activated by said detection of said compression stroke for monitoring said pressure first derivative signal for a change in polarity thereof indicating the completion of the compression stroke and the achievment of the top dead center position by said piston.

10. Apparatus for monitoring the timing of the delivery of fuel to a cylinder of a diesel engine in relation to the transition between the compression stroke and power stroke of the piston in that cylinder, comprsing first transducer means coupled to said engine for producing a first signal upon the initiation of fuel delivery to said cylinder;

a second transducer means coupled to said cylinder for producing a second signal which varies substantially in accordance with the first derivative of pressure within said cylinder;

means responsive to said second transducer signal for producing a third signal indicating a change of polarity of said second transducer signal which occurs between the compression stroke and the power stroke of said piston, indicating the achievement of the top dead center position by said piston; and, means for monitoring the time relationship of said first signal relative to said third signal as an indication of injection timing.

11. Apparatus according to claim 10 for monitoring the timing of fuel delivery from an injection pump to a cylinder of a diesel engine in relation to the transition between the compression strok and power stroke of a piston in that cylinder wherein said first transducer means includes a piezoelectric device coupled to the injection pump such that first signal occurs upon transfer of fuel from said pump toward said cylinder.

12. Apparatus according to claim 10 for monitoring the timing of fuel delivery from an injection pump to an injector nozzle at the cylinder of a diesel engine wherein said transducer means includes a piezoelectric element coupled to said nozzle so that said first signal occurs upon delivery of fuel to said nozzle.

13. Apparatus for monitoring the delivery of fuel to the cylinder of a diesel engine in relation to the transition between the compression stroke and the power stroke of the piston in that cycle, comprising first transducer means coupled to said engine for producing a first signal upon the initiation of fuel delivery to said cylinder;

second transducer means coupled to said cylinder for producing a second signal which varies substantially in accordance with the first derivative of pressure within said cylinder;

means responsive to said second transducer signal for detecting a primary change in amplitude of said second transducer signal which occurs during the compression stroke of said piston;

monitoring means activated upon the detection of said compression stroke for producing a third signal upon a change in polarity of said second transducer signal indicating the transition from the compression stroke to the power stroke by said piston; and, means for monitoring the relationship of said first signal to said third signal as an indication of timing in angular degrees of the piston cycle.

14. Apparatus according to claim 13 for monitoring the delivery of fuel to a cylinder of a diesel engine in relation to the transition between the compression stroke and power stroke of a piston in that cylinder wherein said means for detecting the occurrence of the compression stroke includes a threshold generating circuit coupled to said second transducer means for producing a threshold signal level corresponding to a predetermined percentage of the average peak value of said first derivative signal and means for producing said second signal only when the amplitude of said second signal exceeds said threshold level, said threshold signal level being set above the level of ambient noise on said second transducer signal such that only the primary level change resulting from the compression stroke is detected.